United States Patent
Daigle et al.

(10) Patent No.: US 11,568,752 B2
(45) Date of Patent: Jan. 31, 2023

(54) GATEWAY RETRIEVAL ALERT DEVICE FOR AIRCRAFT PUSHBACK OPERATIONS

(71) Applicant: David Clark Company Incorporated, Worcester, MA (US)

(72) Inventors: Robert A. Daigle, Jefferson, MA (US); Nick Cannata, Sutton, MA (US)

(73) Assignee: David Clark Company Incorporated, Worcester, MA (US)

( * ) Notice: Subject to any disclaimer, the term of this patent is extended or adjusted under 35 U.S.C. 154(b) by 379 days.

(21) Appl. No.: 16/774,451

(22) Filed: Jan. 28, 2020

(65) Prior Publication Data
US 2021/0233420 A1    Jul. 29, 2021

(51) Int. Cl.
*G08G 5/06* (2006.01)
*G08G 5/00* (2006.01)
*H04W 4/80* (2018.01)
*H04B 17/318* (2015.01)
*H04B 7/185* (2006.01)

(52) U.S. Cl.
CPC ........... *G08G 5/065* (2013.01); *G08G 5/0013* (2013.01); *H04B 7/18506* (2013.01); *H04B 17/318* (2015.01); *H04W 4/80* (2018.02); *G08G 5/06* (2013.01)

(58) Field of Classification Search
CPC ........ G08G 5/065; G08G 5/0013; G08G 5/06; H04B 17/318; H04B 7/18506; H04W 4/80
See application file for complete search history.

(56) References Cited

U.S. PATENT DOCUMENTS

| | | | |
|---|---|---|---|
| 8,290,526 B2 | 10/2012 | Broadley et al. | |
| 2007/0112461 A1* | 5/2007 | Zini | G05D 1/0242 700/245 |
| 2007/0244641 A1* | 10/2007 | Altan | B60W 50/16 701/2 |
| 2013/0225685 A1* | 8/2013 | Atkinson | A61K 9/0019 514/570 |
| 2013/0321192 A1* | 12/2013 | Starr | G01S 13/91 342/29 |
| 2014/0121955 A1* | 5/2014 | Erickson | G08G 5/0013 701/120 |
| 2016/0205724 A1* | 7/2016 | Shi | H04B 7/18506 370/254 |
| 2016/0365917 A1* | 12/2016 | Small | H04W 64/00 |
| 2017/0048376 A1* | 2/2017 | Logan | H04L 12/2827 |

* cited by examiner

*Primary Examiner* — Behrang Badii
*Assistant Examiner* — Jay Khandpur
(74) *Attorney, Agent, or Firm* — Burns & Levinson LLP; Steven M. Mills

(57) ABSTRACT

A gateway retrieval alert device is configured for use in an aircraft ground support system. The gateway retrieval alert device is connected to an intercom gateway, either through a direct wireless connection or through a direct connection to a headset of a tug operator, the headset in turn being wirelessly connected to the intercom gateway. The integrity of the wireless link to the intercom gateway is monitored, and when the integrity of the link falls below a set threshold, an alert is issued. The alert is issued externally to the communication network between the ground crew and pilot.

20 Claims, 4 Drawing Sheets

GATEWAY RETRIEVAL ALERT DEVICE FOR AIRCRAFT PUSHBACK OPERATIONS

FIELD OF THE TECHNOLOGY

The subject disclosure relates to devices used during pushback operations of an aircraft, and particularly to alert devices for pushback operations.

BACKGROUND OF THE TECHNOLOGY

Before an aircraft takes off, pushback operations are performed to move the aircraft away from the gate. Pushback operations are assisted by a ground crew, including a pushback tug operator and wing walkers. The tug operator operates the pushback tug which physical pushes or pulls the aircraft, while the wing walkers watch the wings and ensure they don't collide with any objects. During this procedure, it is necessary that the pilot and ground crew can communicate. As such, an intercom gateway is used to wirelessly link the ground crew members. The intercom gateway is normally attached to the aircraft and connected to a service interphone system of the airplane using a wired connection to put the ground crew in communication with the pilot. Once pushback operations are complete, the intercom gateway system must be removed by the ground crew. However, in some cases, the ground crew forgets to remove the intercom gateway from the aircraft before returning to the gate. This error can result in loss of or damage to the intercom gateway, or in the worst case scenario, significant damage to the aircraft, potentially resulting in catastrophic loss of the aircraft.

This problem has been combatted using a number of different solutions. In some cases, a high visibility banner is attached to the intercom gateway to visually alert and remind the pushback crew to remove the intercom gateway (e.g. the banner may say "Remove Before Flight"). However, line of sight from cognizant ground crew can be obscured by the aircraft itself, depending on the location of the aircraft's service interphone connection. Other visual reminders have also been used. For example, the intercom gateway is normally attached to the airplane via a tether. The tether can be designed as a visual reminder, either by employing a large tether with a highly visible color that can serve as a reminder, or by including a banner or message on the tether itself. Such tethers can be cumbersome, and therefore can sometimes present an entanglement hazard and may be deliberately not used by the ground crew on some occasions. An additional drawback of any of the aforementioned visual reminders is that the ground crew must still look in the direction of the intercom gateway and/or alert after pushback operations are complete, and must also recognize that the visual alert means the intercom gateway was erroneously left attached to the aircraft.

Audio prompts through the headset equipment of the ground crew and pilot have also been used. In such a case, an alert audio prompt can be triggered when a distance between a transceiver in the intercom gateway and a transceiver in the tug operator's headset becomes larger than would be expected during normal pushback operations, suggesting the operation is complete and the intercom gateway has been left attached to the airplane. Unfortunately, these alerts can often be missed, as it is common practice for the pilot to switch the channel of their headset from the service intercom (i.e. connection to the pushback ground crew) to the aircraft operations intercom after being waved off by the ground crew for taxi, causing the pilot to miss any alert delivered through the service intercom. Similarly, common practice is for the ground crew to remove their headsets almost immediately after completing pushback operations and waving off the pilot for taxi, causing the ground crew to likewise miss the audio alert prompt which would only issue once the aircraft has moved far enough away to trigger such an alert. As such, there is a need to more reliably alert the ground crew and/or pilot when the intercom gateway remains attached to the aircraft after pushback operations.

SUMMARY OF THE TECHNOLOGY

In light of the needs described above, in at least one aspect, the subject technology relates to a gateway retrieval alert device which is separate from the ground crew communication devices used in the wireless communication system and provides an external alert when the intercom gateway has been left attached to the aircraft after pushback operations.

In at least one aspect, the subject technology relates to a wireless ground support system for communication between a ground crew and a pilot of an aircraft. The system includes an intercom gateway, a gateway retrieval alert device, and at least one communication device of the ground crew. The intercom gateway is configured to allow wireless communication between the communication devices of the ground crew over a network. The intercom gateway is also configured to connect to the aircraft via a wired connection to allow communication between the ground crew and the pilot over the network. A first communication device of the ground crew is configured to wirelessly connect to the intercom gateway for communication over the network. The gateway retrieval alert device is proximate and external to the first communication device. The gateway retrieval alert device is configured to wirelessly connect to the intercom gateway and monitor an integrity of a wireless link between the intercom gateway and the gateway retrieval alert device, determine if the integrity of the wireless link falls below a set threshold, and issue an alert through a dedicated output of the gateway retrieval alert device if the integrity of the wireless link falls below the set threshold.

In at least one embodiment, the set threshold is based on a lowest possible link integrity while the first communication device is connected to the aircraft via the intercom gateway, and the intercom gateway and gateway retrieval alert device are within a set distance margin. In some cases, the gateway retrieval alert device is configured to connect to the intercom gateway via a connection between the gateway retrieval alert device to the first communication device, either via wired or wireless means, and the integrity of the wireless link between the intercom gateway and the gateway retrieval alert device being defined by a wireless connection between the first communication device and the intercom gateway. In some cases, the gateway retrieval alert device is configured to connect to the first communication device via a short range RF connection. In other cases, the gateway retrieval alert device is configured to directly connect to the intercom gateway through a wireless connection, the integrity of the wireless link being defined by said wireless connection.

In some embodiments, the alert can be an audio and/or visual alert. In some cases, the gateway retrieval alert device is further configured to issue the alert omnidirectionally. In some embodiments, the first communication device can configured for use by a tug operator of a pushback tug. The gateway retrieval alert device can include a temporary fastening device and can be configured to mechanically connect to the pushback tug. The system can include at least one additional communication device configured for use by a wing walker of the ground crew, the at least one additional communication device configured to wirelessly connect to the intercom gateway to allow communication with the ground crew and pilot over the network.

In some embodiments, the set threshold for the alert is based on signal integrity measures corresponding to a predetermined distance between the gateway retrieval alert device and the intercom gateway. In some cases, the integrity of the wireless link is based on one or both of the following: received signal strength indicators; or bit error rates.

In at least one aspect, the subject technology relates to a gateway retrieval alert device for use in a wireless ground support system, the wireless ground support system including an intercom gateway configured to connect to an aircraft via a wired connection to allow communication between a communication device of a pilot and at least one communication device of a at least one ground crew member over a network. The gateway retrieval alert device can include a transceiver configured to wirelessly connect to the intercom gateway. The gateway retrieval alert device can also be configured to monitor an integrity of a wireless link between the intercom gateway and the gateway retrieval alert device. The gateway retrieval alert device has a dedicated output device configured to issue an alert when an integrity of the wireless link falls below a set threshold. The gateway retrieval alert device is external to the network and communication devices.

In some embodiments, the gateway retrieval alert device is configured to connect to the intercom gateway via a direct connection between the gateway retrieval alert device and a first communication device, the first communication device being wirelessly connected to the intercom gateway, the integrity of the wireless link between the intercom gateway and the gateway retrieval alert device being defined by the wireless connection between the first communication device and the intercom gateway. The gateway retrieval alert device can be configured to connect to the first communication device via a short range RF connection, or via a wired connection.

In some embodiments the gateway retrieval alert device is configured to directly connect to the intercom gateway through a wireless connection, the integrity of the wireless link being defined by said wireless connection. In some cases, the alert is a visual or audio alert issued external to the network and the gateway retrieval alert device is further configured to issue the alert omnidirectionally. The gateway retrieval alert device can be configured for inclusion in a wireless belt station connected to a first communication device, the first communication device being wirelessly connected to the intercom gateway, the integrity of the wireless link between the intercom gateway and the gateway retrieval alert device being defined by the wireless connection between the first communication device and the intercom gateway. The set threshold can be based on signal integrity measures corresponding to a predetermined distance between the gateway retrieval alert device and the intercom gateway. The integrity of the wireless link can be based on one or both of the following: received signal strength indicators; or bit error rates.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
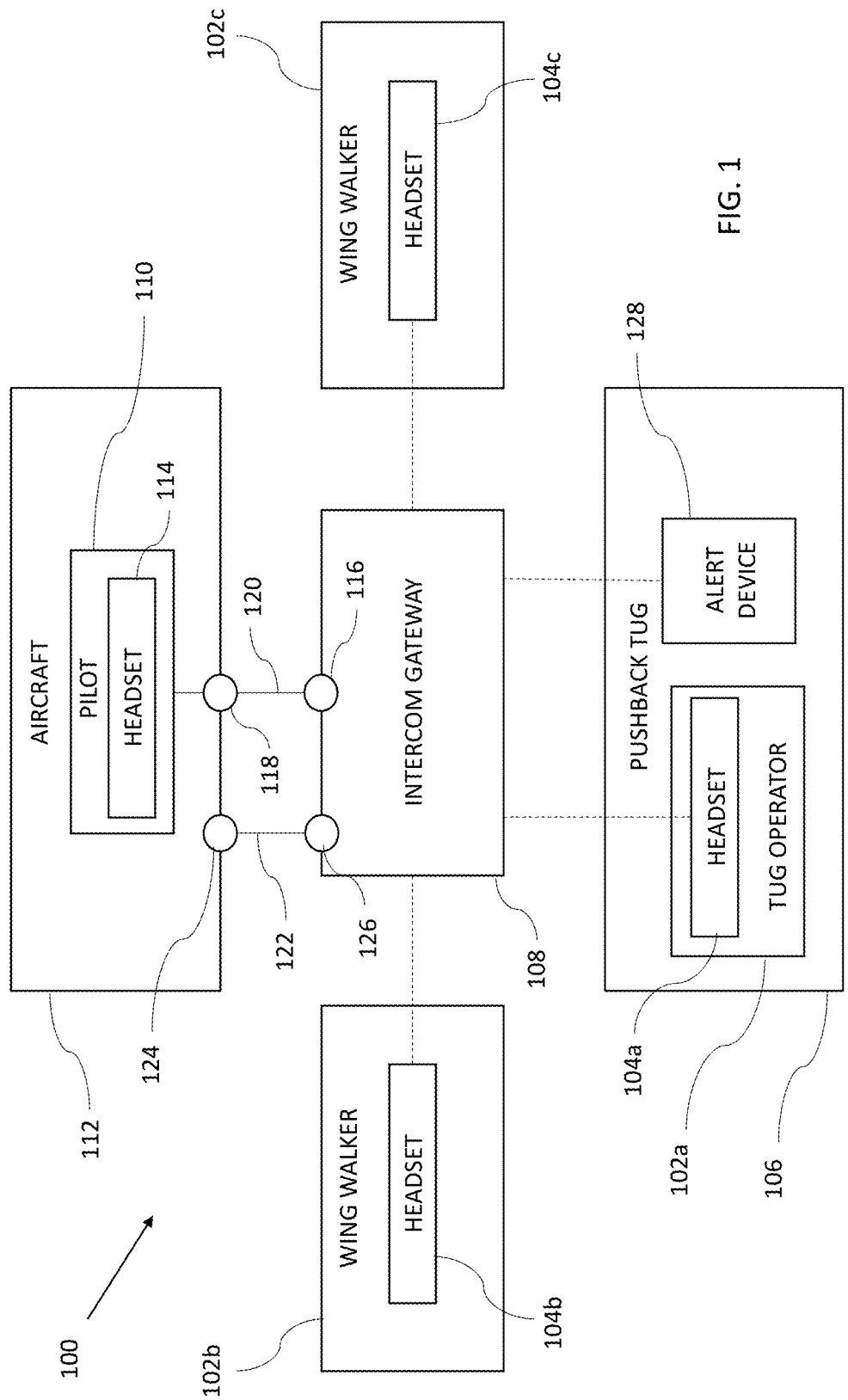
FIG. 1 is a block diagram of a wireless ground support system for communication between a ground crew and a pilot in accordance with the subject technology.

The subject technology overcomes prior art problems associated with aircraft taxiing and pushback operations. In brief summary, the subject technology provides a device which effectively alerts a ground crew member when they have failed to retrieve the intercom gateway at the end of pushback operations. The advantages, and other features of the systems and methods disclosed herein, will become more readily apparent to those having ordinary skill in the art from the following detailed description of certain preferred embodiments taken in conjunction with the drawings which set forth representative embodiments of the subject technology. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be vertically above).

Referring now to FIG. 1, a wireless ground support system for communication between a ground crew and a pilot of an aircraft is shown generally at 100. For ease of reference, dotted lines are used to show wireless communication between components while solid lines are used to show physical connections including wired communication between devices which are communicatively connected, except as otherwise described herein. In the example shown, the ground crew includes a tug operator 102a on a pushback tug 106, a first wing walker 102b, and a second wing walker 102c (generally 102). During pushback operations, the pushback tug 106 is operated by the tug operator 102a to tow or push the aircraft 112. The wing walkers 102b, 102c observe the wings of the aircraft 112 and alert the tug operator 102a to help direct the movement of the aircraft 112 and avoid any potential collisions with obstacles. Therefore communication between the ground crew 102 is crucial. To that end, each member of the ground crew 102 has a headset 104a, 104b, 104c (generally 104) which is wirelessly connected to a shared intercom gateway 108. Notably headsets are used herein as an exemplary communication device, but it should be understood that the use of other communication devices in lieu of the headsets is also possible. The headsets 104 can operate via a DECT wireless protocol at a reliable wireless range of approximately 300 feet from the intercom gateway 108, enabling hands-free, full communication between the ground crew members 102 over a network. It should be understood that use of other wireless protocol, such as Bluetooth, WiFi, Zigbee or a proprietary RF option is also possible.

The pilot 110 of the aircraft 112 has a headset 114 connected to an interphone system within the aircraft 112. The intercom gateway 108 is manually connected to the aircraft 112 at the beginning of pushback operations to allow communication between the ground crew 102 and the pilot 110. The intercom gateway 108 typically connects to the aircraft interphone system through a wired connection. As such, the intercom gateway 108 can include a locking multi-pin connector 116 while an interphone jack 118 on the exterior of the aircraft 112 can provide a connection to the aircraft interphone system. The ground crew 102 connects one end of a gateway interface cable 120 to the multi-pin connector 116 while a second end is connected to the jack 118 via an appropriate plug. To keep the intercom gateway 108 physically secured to the aircraft 112, the intercom gateway 108 is also tethered to the aircraft 112 with an adjustable lanyard assembly 122. The lanyard assembly 122 includes a nylon hook 124 at or near one extreme end which can attach to the aircraft 112. At the opposing end, the lanyard assembly 122 connects to the intercom gateway 108 via a mechanical fastener 126. The lanyard assembly 122 carries the weight of the intercom gateway 108 and can be vertically adjusted to different hanging heights, allowing for optimal line-of-sight connection between the intercom gateway 108 and the ground crew headsets 104.

This system 100 allows for communication between the ground crew 102 and pilot 110 during pushback operations. Once the pushback operation is complete, one of the ground crew 102 personnel (usually a wingwalker 102b or 102c) is expected to detach and remove the intercom gateway 108 from the aircraft 112, at which point the ground crew 102 will return to the gate with their equipment, including the intercom gateway 108. However, as mentioned above, it is possible that the ground crew 102 forgets to remove the intercom gateway 108 from the aircraft 112 before returning to the gate, potentially resulting in loss of the intercom gateway 108 or damage to the aircraft 112.

The subject technology implements a gateway retrieval alert device 128 on the pushback tug 106 and proximate the tug operator 102a. The gateway retrieval alert device 128 is wirelessly linked to the intercom gateway 108 and operates via the DECT protocol (or other wireless protocol). The gateway alert device 128 is designed to alert the tug operator 102a when the intercom gateway 108 and pushback tug 106 are separated by a further than expected distance, indicating a likely error. This can be done in a number of ways, including relying on a wireless signal between a transceiver of the intercom gateway 108 and a transceiver of the alert device 128. The alert device 128 is located on, or proximate to, the pushback tug 106, and therefore the signal integrity between intercom gateway 108 and the alert device 128 can be used to estimate the distance between the pushback tug 128 and the aircraft 112. Signal integrity will degrade as the distance between the intercom gateway 108 and the alert device 128 increases. Therefore a received signal strength indicator (RSSI), a bit error rate (BER), or other signal integrity measurement between the intercom gateway 108 and the alert device 128 can be measured and associated with a certain distance between the intercom gate 108 and the alert device 128, and therefore a distance between the intercom gateway 108 and the pushback tug 106. If the integrity of the wireless link alert device 128 and the intercom gateway 108 falls to a certain threshold, indicating the distance between the alert device 128 and intercom gateway 108 is larger than would be expected during normal pushback tug operation (where the intercom gateway 108 is connected to the aircraft 112 and the pushback tug 106 is moving the aircraft 112), the alert device 128 issues an alert through a dedicated output, as will be discussed in more detail below. Therefore, upon completion of the push-back procedure, and after the pushback tug 106 is mechanically disengaged from the aircraft 112 thereby clearing the aircraft 112 for taxi to the runway, if the intercom gateway 108 is accidently left attached to the aircraft 112, the distance between the aircraft 112 and the pushback tug 106 will increase until the threshold of wireless range between intercom gateway 108 and alert device 128 triggers the alert. The alert will notify the tug operator 102a that the intercom gateway 108 has been left attached to the aircraft 112. The tug operator 102a can then either contact the pilot 110 directly, or, if the ground crew 102 can no longer communicate with the pilot 110, the tug operator 102a can contact airport ground operations who can halt the aircraft 112 and request the aircraft 112 return to the gate area for removal of the intercom gateway 108 prior to take-off.

Figure 2:
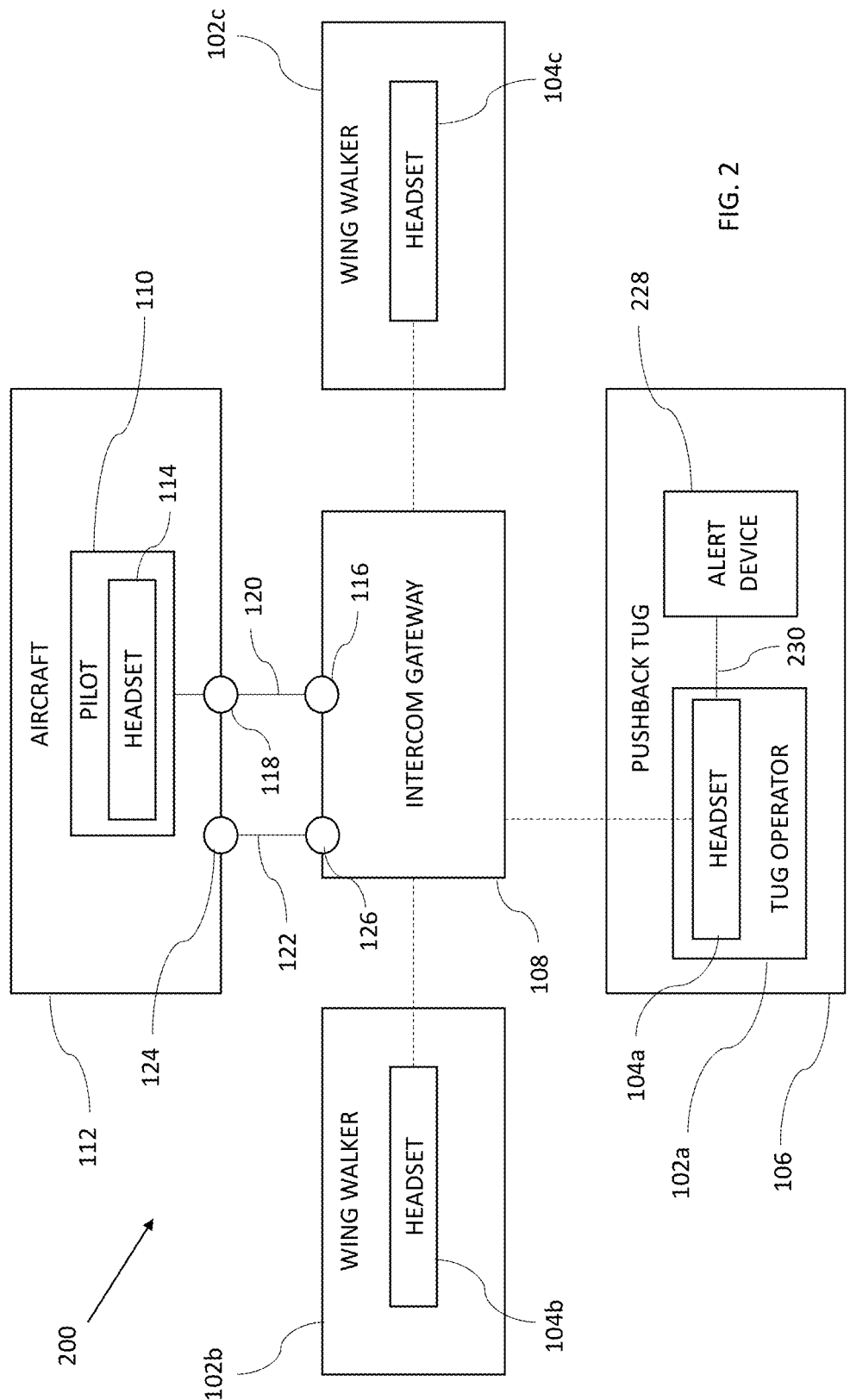
FIG. 2 is a block diagram of another embodiment of a wireless ground support system for communication between a ground crew and a pilot of an aircraft in accordance with the subject technology.

Referring now to FIG. 2, a block diagram of another wireless ground support system is shown generally at 200. The system 200 is similar to the system 100 except as otherwise shown and described herein. In particular, the system 200 includes a modified alert device 228, as compared to the alert device 128 of FIG. 1. Instead of maintaining a wireless signal to the intercom gateway 108 directly, the alert device 228 is linked to the headset 104a of the tug operator 102a and connected to the intercom gateway 108 through the wireless connection between the headset 104a and the intercom gateway 108. The link 230 between the alert device 228 and headset 104a can be a cable for a wired connection, or a wireless link 230 through a short range RF connection, Bluetooth, or other wireless protocol. The alert device 228 then monitors the integrity of the signal between the headset 104a and the intercom gateway 108, and issues the alert when the integrity of that signal has fallen below an alert threshold. Again, since the pushback tug 106 is never beyond a set distance from the intercom gateway 108 during pushback operations, the alert threshold can be set based on the lowest possible link integrity for that distance margin. In some cases, the tug operator's headset 102a can be wirelessly linked to the intercom gateway 108 via a DECT wireless protocol through use of modified firmware which increases the bit error rate and reduces the received signal strength indication by predetermined levels such that the effective wireless range between the tug operator 102a and intercom gateway 108 is reduced a considerable degree from the normal range (e.g., approximately 20% of the headset 104a range).

Figure 3A:
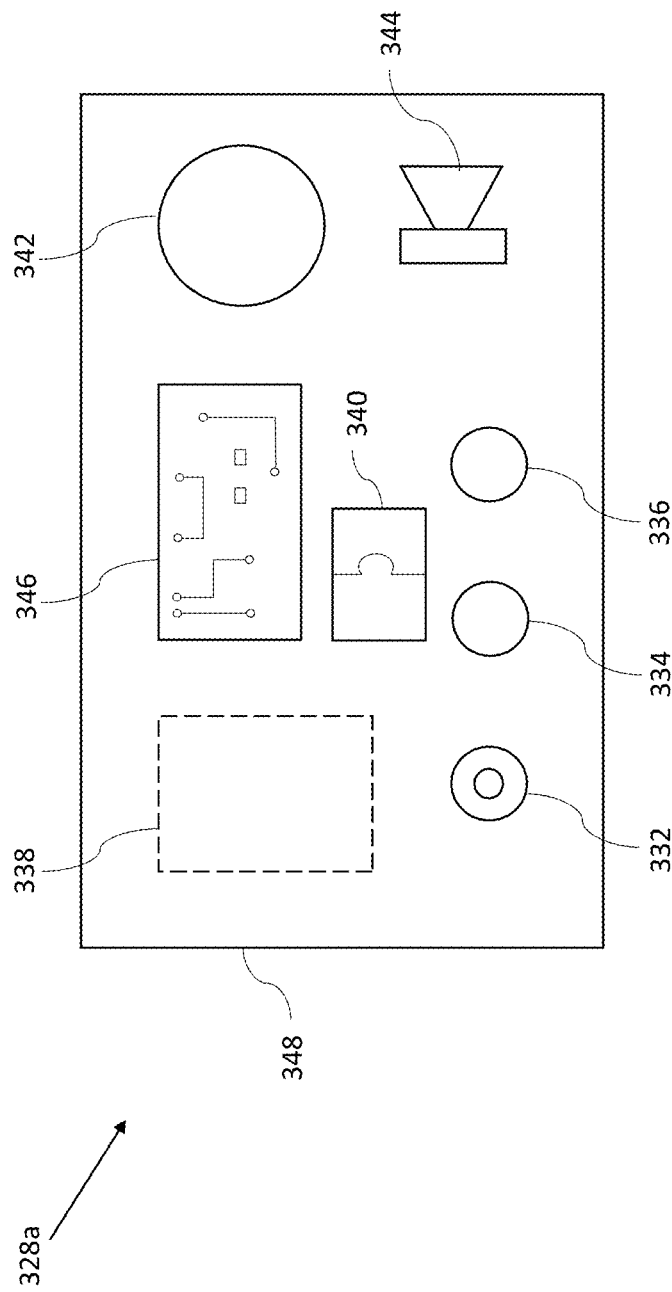
FIG. 3A is a schematic diagram of a gateway retrieval alert device in accordance with the subject technology.

Referring now to FIG. 3A, a schematic diagram of an embodiment of a gateway retrieval alert device 328a is shown. Other gateway retrieval alert devices 128, 228 shown and discussed herein can include similar components to the gateway retrieval alert device 328a.

The alert device 328a has inputs, including a power button 332 with an integral LED feature, a link button 334, and an alert kill switch 336. Actuating the power button 332 toggles the input device 328a power between on and off states. The link button 334 can be actuated to toggle the wireless capabilities of the alert device 328a on or off, allowing the alert device to wirelessly connect to an intercom gateway or headset, as the case may be. The alert kill switch 336 can be actuated to turn off the alert feature of the alert device 328, or to terminate an alert that is currently being issued.

The alert device 328a includes a sealed battery compartment 338 which houses batteries for supplying power to the device 328a. A mechanical fastening device 340 allows the alert device 328a to be removably attached to a support structure as needed. Thus, during operation, the alert device 328a can be attached to the pushback tug via the mechanical fastening device 340. The alert device 328a also includes output devices 342, 344 for issuing the alerts discussed herein. In the example given, the alert device 328a includes a visual alert output 342, which can be an LED, other illuminated beacon light, or the like, covered with a weather and impact resistant translucent cover. Further, the alert device 328a includes an audio alert output 344 in the form of an audible horn, speaker assembly, or the like, similarly covered for protection from weather and impact. Alerts from either output 342, 344 can be issued in an expected direction of the tug operator, or omnidirectionally. While the alert device 328a is shown with both visual and audio alert outputs 342, 344, it should be understood that other embodiments need only include either an audio or visual alert output 342, 344. In operation, the alert device 328a is positioned on, or proximate to the pushback tug so that the audio and/or visual alert can be easily recognized by the tug operator. The alert device 328a also includes a processing module 346, which can be one or more PCBA(s), or other similar processing device. The processing module 346 provides all cross-functional electronic circuitry for the alert device 328a, and can include a transceiver device. All components of the alert device 328a are housed in a single, rugged and marine-grade, waterproof enclosure 348.

Figure 3B:
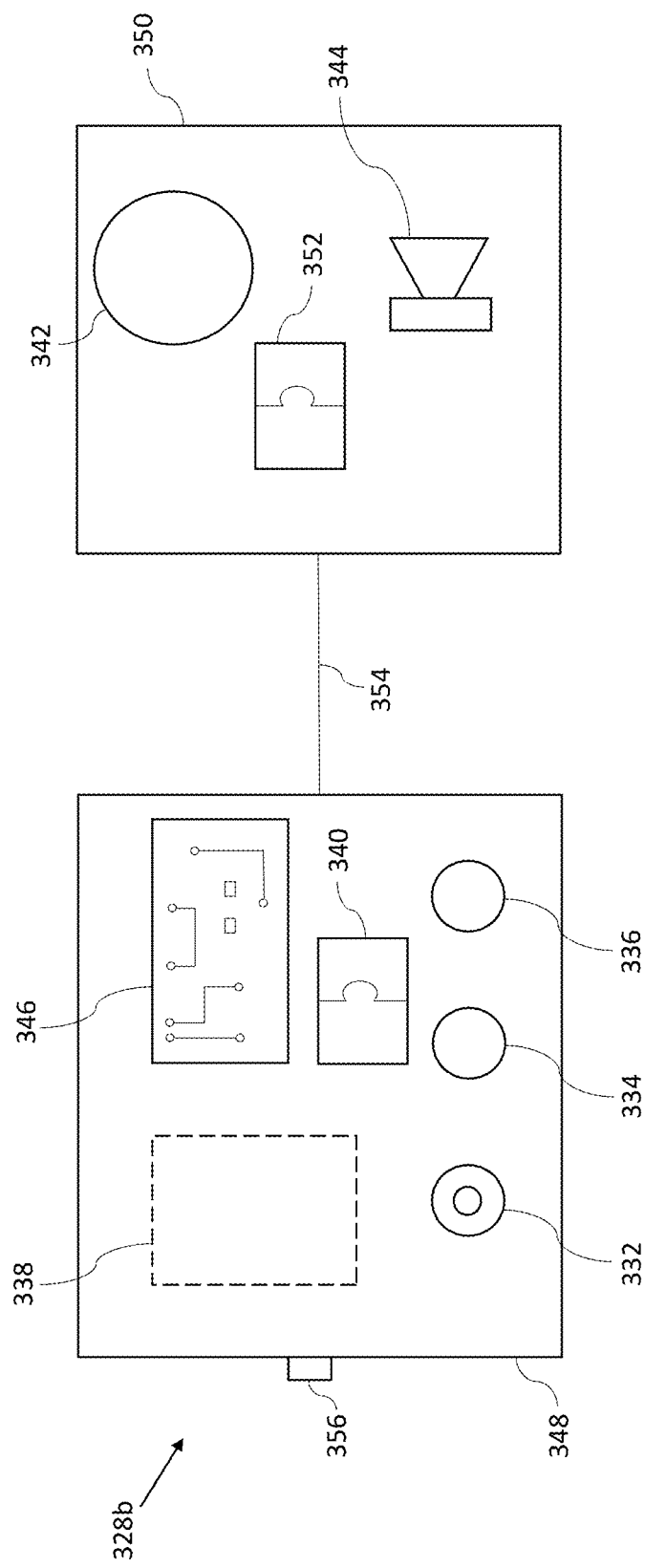
FIG. 3B is a schematic diagram of another embodiment of a gateway retrieval alert device in accordance with the subject technology.

Referring now to FIG. 3B, another schematic diagram of an embodiment of a gateway retrieval alert device 328b is shown. The gateway retrieval device 328b is similar to the gateway retrieval alert device 328a except as otherwise shown and described herein.

The gateway retrieval alert device 328b includes a separate rugged output enclosure 350 housing the output devices 342, 344. The output enclosure 350 has a designated mechanical fastening device 352, which can function similarly to the mechanical fastening device 340, connecting the output enclosure 350 to a support structure, such as part of the pushback tug. The output devices 342, 344 can then be electrically connected to the components within the other enclosure 348 via a wired (e.g. cable) or wireless (e.g. Bluetooth, FM, or the like) connection 354. In some cases, the first enclosure 348 can be a wireless belt station of the tug operator. The second enclosure 350 can be separately affixed to the pushback tug in a location where the tug operator is likely to see and/or hear the alert, as the case may be. In some cases, the first enclosure 348 can be the tug operator's wireless belt station (or alternatively, can be configured for inclusion within an existing wireless belt station) and a port 356 is included which allows for a wired connection between the alert device 328b and the tug operator's headset.

It should be understood that the gateway retrieval devices 128, 228 can be configured similarly to the gateway retrieval alert devices 328a, 328b. Notably, the specific components and features of all gateway retrieval alert devices are shown by way of example, and it should be understood that the gateway retrieval alert devices need not include the specific components and features shown and described to carry out the functions of the gateway retrieval devices as described.

Overall, the gateway retrieval alert devices provide a separate device for push operations which can be a stand-alone device, or which can be integrated into an existing intercom system, such as by inclusion within the wireless belt station of the tug operator. The gateway retrieval alert device provides a visual and/or audio alert to a ground crew member, such as a blinking alert strobe or loud alarm, telling them when the intercom gateway has exceeded an expected distance from the pushback tug. Advantageously, the visual alert is proximate to the ground crew member being alerted (e.g. next to the pushback tug operator on the pushback tug) making the visual alert easily recognizable at all times. The audio alert is provided separate from, and external to, the communication channel between the ground crew and/or pilot, and at a location on the pushback tug allowing the tug operator to clearly hear the audio alert even after all members of the ground crew have removed their headsets. Further, the gateway retrieval alert device is relatively easy to handle, as compared to other solutions such as a large visible tether on the intercom gateway, and can be attached or removed from the pushback tug with no difficulty.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. connections and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A wireless ground support system for communication between a ground crew and a pilot of an aircraft comprising:
    an intercom gateway configured to:
        allow wireless communication between communication devices of the ground crew over a network; and
        physically connect to an exterior of the aircraft to form a wired connection between the intercom gateway and an aircraft interphone system to allow communication between the ground crew and the pilot over the network, via the intercom gateway;
    a first communication device of the ground crew configured to wirelessly connect to the intercom gateway for communication over the network; and
    a gateway retrieval alert device proximate and external to the first communication device and configured to:
        connect to the intercom gateway and monitor an integrity of a wireless link between the intercom gateway and the gateway retrieval alert device;
        determine if the integrity of the wireless link falls below a set threshold; and
        issue an alert through a dedicated output of the gateway retrieval alert device if the integrity of the wireless link falls below the set threshold.

2. The system of claim 1, wherein the set threshold is based on a lowest possible link integrity while the first communication device is connected to the aircraft via the intercom gateway, and the intercom gateway and gateway retrieval alert device are within a set distance margin.

3. The system of claim 1, wherein the gateway retrieval alert device is configured to connect to the intercom gateway via a connection between the gateway retrieval alert device to the first communication device, the integrity of the wireless link between the intercom gateway and the gateway retrieval alert device being defined by a wireless connection between the first communication device and the intercom gateway.

4. The system of claim 3, wherein the gateway retrieval alert device is configured to connect to the first communication device via a short range RF connection.

5. The system of claim 1, wherein the gateway retrieval alert device is configured to directly connect to the intercom gateway through a wireless connection, the integrity of the wireless link being defined by said wireless connection.

6. The system of claim 1, wherein the gateway retrieval alert device is further configured to issue the alert omnidirectionally.

7. The system of claim 1, wherein:
the first communication device is configured for use by a tug operator of a pushback tug;
the gateway retrieval alert device is configured to mechanically connect to the pushback tug; and
the system further includes at least one additional communication device configured for use by a wing walker of the ground crew, the at least one additional communication device configured to wirelessly connect to the intercom gateway to allow communication with the ground crew and pilot over the network.

8. The system of claim 1, wherein the gateway retrieval alert device further comprises a temporary fastening device configured to attach the gateway retrieval alert device to a pushback tug.

9. The system of claim 1, wherein the set threshold is based on signal integrity measures corresponding to a predetermined distance between the gateway retrieval alert device and the intercom gateway.

10. The system of claim 1, wherein the integrity of the wireless link is based on at least one of the following: received signal strength indicators; or bit error rates.

11. The system of claim 1, wherein the alert is a visual or audio alert issued external to the network.

12. A gateway retrieval alert device for use in a wireless ground support system, the wireless ground support system including an intercom gateway configured to physically connect to an exterior of an aircraft to form a wired connection between the intercom gateway and an aircraft interphone system to allow communication between a communication device of a pilot and at least one communication device of a at least one ground crew member over a network, the gateway retrieval alert device comprising:

a transceiver configured to wirelessly connect to the intercom gateway and monitor an integrity of a wireless link between the intercom gateway and the gateway retrieval alert device; and
a dedicated output device configured to issue an alert when an integrity of the wireless link falls below a set threshold,
wherein the gateway retrieval alert device is external to the network and communication devices.

13. The system of claim 12, wherein the gateway retrieval alert device is configured to connect to the intercom gateway via a direct connection between the gateway retrieval alert device and a first communication device, the first communication device being wirelessly connected to the intercom gateway, the integrity of the wireless link between the intercom gateway and the gateway retrieval alert device being defined by the wireless connection between the first communication device and the intercom gateway.

14. The system of claim 13, wherein the gateway retrieval alert device is configured to connect to the first communication device via a short range RF connection.

15. The system of claim 13, wherein the gateway retrieval alert device is configured to connect to the first communication device via a wired connection.

16. The system of claim 12, wherein the gateway retrieval alert device is configured to directly connect to the intercom gateway through a wireless connection, the integrity of the wireless link being defined by said wireless connection.

17. The system of claim 12, wherein:
the alert is a visual or audio alert issued external to the network; and
the gateway retrieval alert device is further configured to issue the alert omnidirectionally.

18. The system of claim 12, wherein the gateway retrieval alert device is configured for inclusion in a wireless belt station connected to a first communication device, the first communication device being wirelessly connected to the intercom gateway, the integrity of the wireless link between the intercom gateway and the gateway retrieval alert device being defined by the wireless connection between the first communication device and the intercom gateway.

19. The system of claim 12, wherein the set threshold is based on signal integrity measures corresponding to a predetermined distance between the gateway retrieval alert device and the intercom gateway.

20. The system of claim 12, wherein the integrity of the wireless link is based on one at least one of the following: received signal strength indicators; or bit error rates.

* * * * *